US012803703B2

(12) United States Patent
Li et al.

(10) Patent No.: US 12,803,703 B2
(45) Date of Patent: Nov. 17, 2026

(54) METHOD FOR DETECTING PDCCH AND TERMINAL

(71) Applicant: VIVO MOBILE COMMUNICATION CO., LTD., Dongguan (CN)

(72) Inventors: Dongru Li, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 643 days.

(21) Appl. No.: 17/870,789

(22) Filed: Jul. 21, 2022

(65) Prior Publication Data

US 2022/0360364 A1 Nov. 10, 2022

Related U.S. Application Data

(63) Continuation of application No. PCT/CN2021/072404, filed on Jan. 18, 2021.

(51) Int. Cl.
*H04L 1/00* (2006.01)
*H04L 5/00* (2006.01)
*H04W 72/20* (2023.01)

(52) U.S. Cl.
CPC .......... *H04L 1/0039* (2013.01); *H04L 5/0023* (2013.01); *H04W 72/20* (2023.01)

(58) Field of Classification Search
CPC ... H04L 1/0039; H04L 5/0023; H04L 1/0072; H04L 5/0098; H04L 5/001; H04L 5/0053; H04L 1/0038; H04W 72/20; H04W 52/02; H04W 76/28; H04W 52/0225; H04W 52/0248; Y02D 30/70
See application file for complete search history.

(56) References Cited

U.S. PATENT DOCUMENTS

| | | | | |
|---|---|---|---|---|
| 11,395,283 | B2 * | 7/2022 | Lin | H04L 5/0053 |
| 2013/0028108 | A1 * | 1/2013 | Wu | H04L 5/0094 370/252 |
| 2018/0145800 | A1 * | 5/2018 | Srivastav | H04L 1/188 |
| 2018/0270756 | A1 * | 9/2018 | Bhattad | H04W 76/27 |
| 2019/0349147 | A1 * | 11/2019 | Aiba | H04L 1/1861 |
| 2020/0236692 | A1 * | 7/2020 | Lin | H04W 72/535 |
| 2020/0314898 | A1 * | 10/2020 | Sun | H04L 1/1819 |
| 2020/0351926 | A1 * | 11/2020 | Bagheri | H04W 52/0216 |
| 2021/0029772 | A1 * | 1/2021 | Islam | H04L 1/1614 |
| 2021/0067268 | A1 * | 3/2021 | Seo | H04L 1/0052 |
| 2021/0136685 | A1 * | 5/2021 | Sun | H04W 52/0274 |
| 2021/0144717 | A1 * | 5/2021 | Tsai | H04L 5/0035 |

(Continued)

FOREIGN PATENT DOCUMENTS

CN 110536381 A 12/2019

OTHER PUBLICATIONS

First Office Action issued in related Chinese Application No. 202010076798.3, mailed Sep. 19, 2022, 7 pages.

(Continued)

*Primary Examiner* — Chuong M Nguyen
(74) *Attorney, Agent, or Firm* — IPX PLLC

(57) ABSTRACT

A method for detecting a PDCCH and a terminal are provided. The method includes: detecting a first PDCCH, the first PDCCH carries DCI format 1-1 or DCI format 0-1; determining an active search space group according to a detection result of the first PDCCH; and performing PDCCH detection on the active search space group.

14 Claims, 3 Drawing Sheets

(56) References Cited

U.S. PATENT DOCUMENTS

| | | | | |
|---|---|---|---|---|
| 2021/0168775 A1* | 6/2021 | Hang | .................... | H04L 5/0094 |
| 2022/0104216 A1* | 3/2022 | Wu | ..................... | H04W 72/535 |
| 2022/0150946 A1* | 5/2022 | Tsai | ...................... | H04L 1/1848 |
| 2022/0279579 A1* | 9/2022 | He | ...................... | H04L 27/2607 |
| 2022/0353921 A1* | 11/2022 | You | ..................... | H04W 74/006 |

OTHER PUBLICATIONS

International Search Report issued in corresponding International Application No. PCT/CN2021/072404, mailed Apr. 16, 2021, 4 pages.

LG Electronics, "Discussion on PDCCH-based power saving signal/channel", 3GPP TSG RAN WG1 Meeting #96bis, R1-1904635, Apr. 12, 2019.

Sony, "On PDCCH-based power saving channel", 3GPP TSG RAN WG1 #98bis, R1-1910751, Oct. 18, 2019.

* cited by examiner

METHOD FOR DETECTING PDCCH AND TERMINAL

CROSS-REFERENCE TO RELATED APPLICATIONS

This application is a continuation of International Application No. PCT/CN2021/072404, filed Jan. 18, 2021, which claims priority to Chinese Patent Application No. 202010076798.3, filed Jan. 23, 2020. The entire contents of each of the above-referenced applications are expressly incorporated herein by reference.

TECHNICAL FIELD

Embodiments of the present disclosure relate to the field of communications technologies, and in particular to a method for detecting a Physical Downlink Control Channel (PDCCH) and a terminal.

BACKGROUND

A New Radio (NR) system supports the configuration of different parameters such as PDCCH monitoringSlotPeriodicity (monitoring Slot Periodicity), offset, monitoring duration, aggregation level, and blind detection times for each piece of PDCCH search space.

A network side configures a plurality of pieces of search spaces for a terminal to monitor and detect a PDCCH, but frequent blind detection on the PDCCH will increase power consumption for the terminal.

SUMMARY

Embodiments of the present disclosure are intended to provide a method for detecting a PDCCH and a terminal.

According to a first aspect, an embodiment of the present disclosure provides a method for detecting a PDCCH, including:

- detecting a power-saving physical downlink control channel PS-PDCCH;
- determining, according to a detection result of the PS-PDCCH, an active search space group within an active time under discontinuous reception DRX configuration; and performing PDCCH detection on the active search space group.

According to a second aspect, an embodiment of the present disclosure provides a method for detecting a PDCCH, including:

- detecting a first PDCCH, where the first PDCCH carries DCI format 1-1 and/or DCI format 0-1;
- determining an active search space group according to a detection result of the first PDCCH; and
- performing PDCCH detection on the active search space group.

According to a third aspect, an embodiment of the present disclosure provides a terminal, including:

- a first detecting module, configured to detect a PS-PDCCH; and
- a first determining module, configured to determine, according to a detection result of the PS-PDCCH, an active search space group within an active time under DRX configuration; and
- a second detecting module, configured to perform PDCCH detection on the active search space group.

According to a fourth aspect, an embodiment of the present disclosure provides a terminal, including:

- a third detecting module, configured to detect a first PDCCH, where the first PDCCH carries DCI format 1-1 or DCI format 0-1;
- a second determining module, configured to determine an active search space group according to a detection result of the first PDCCH; and
- a third detecting module, configured to perform PDCCH detection on the active search space group.

According to a fifth aspect, an embodiment of the present disclosure provides a terminal, including: a processor, a memory, and a program that is stored in the memory and that can be run on the processor, where when the program is executed by the processor, the steps of the method for detecting a PDCCH according to the first aspect or the second aspect are implemented.

According to a sixth aspect, an embodiment of the present disclosure provides a computer readable storage medium, where the computer readable storage medium stores a computer program, and when the computer program is executed by a processor, the steps of the method for detecting a PDCCH according to the first aspect or the second aspect are implemented.

In the embodiments of the present disclosure, the indication of the search space group switching is obtained through the detection result of the PDCCH, so that the terminal can perform the PDCCH detection on the corresponding active search space group according to the indication of the search space group switching, which can reduce frequent blind detection on the PDCCH by the terminal and achieve energy saving and power saving for the terminal.

BRIEF DESCRIPTION OF DRAWINGS

It becomes clear for those of ordinary skill in the art to learn various other advantages and benefits by reading detailed description of the following implementation manners. The accompanying drawings are merely used to show preferred implementation manners, and are not considered as limitations to the present disclosure. In addition, in all the accompanying drawings, a same reference symbol is used to represent a same part. In the accompanying drawings.

DETAILED DESCRIPTION

Figure 1:
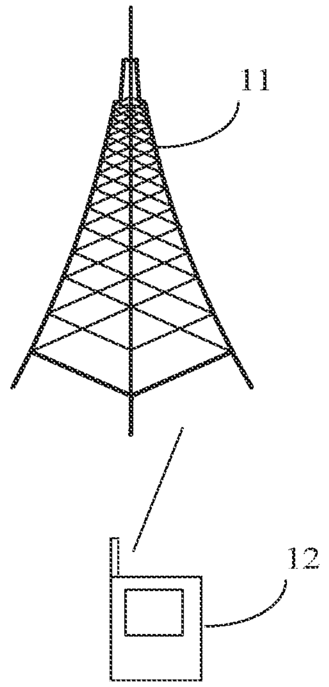
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term “include” and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, “and/or” used in the description and the claims means at least one of the connected objects. For example, A and/or B represents the following three cases: Only A exists, only B exists, and both A and B exist.

In the embodiments of the present disclosure, the term such as “exemplary” or “for example” is used to represent an example, an instance, or a description. Any embodiment or design solution described as “exemplary” or “for example” in the embodiments of the present disclosure should not be construed as being more preferred or advantageous than other embodiments or design solutions. To be precise, the use of the term such as “exemplary” or “for example” is intended to present a related concept in a specific manner.

The technology described herein is not limited to a Long Time Evolution (LTE)/LTE-Advanced (LTE-A) system, and can also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

The terms “system” and “network” are often exchanged in use. The CDMA system can implement radio technologies such as CDMA2000 and Universal Terrestrial Radio Access (UTRA). The UTRA includes wideband CDMA (WCDMA) and other CDMA variants. The TDMA system may implement a radio technology such as Global System for Mobile Communication (GSM). The OFDMA system can implement radio technologies such as Ultra Mobile Broadband (UMB), Evolution-UTRA (E-UTRA), IEEE802.11 (Wi-Fi), IEEE802.16 (WiMAX), IEEE802.20, and Flash-OFDM. The UTRA and E-UTRA are parts of a Universal Mobile Telecommunications System (UMTS). LTE and advanced LTE (for example, LTE-A) are new UMTS versions that use E-UTRA. The UTRA, E-UTRA, UMTS, LTE, LTE-A, and GSM are described in documents from an organization named “3rd Generation Partnership Project” (3GPP). The CDMA2000 and UMB are described in a document of an organization named “3rd Generation Partnership Project 2” (3GPP2). The technologies described in the present disclosure may also be used in the foregoing systems and radio technologies, and may also be used in another system and radio technology.

In the embodiments of the present disclosure, there may be two or more search space groups. For example, at least two search space groups are configured through Radio Resource Control (RRC). At least two search space groups are configured for one Band Width Part (BWP). The network may configure at least two search space groups on all BWPs through RRC signaling, and configuration parameters for the at least two search space groups on each BWP may be different. The BWP is another BWP except an initial BWP.

Different search space groups may contain one or more search space, and differences among different search space groups include at least one of the following features:

(1) a difference in monitoringSlotPeriodicity And Offset;

(2) a difference in duration;

(3) a difference in an aggregation level or a maximum aggregation level; or (4) a difference in blind detection times or maximum blind detection times.

It can be understood that the features (1), (2), (3), and (4) may be configured through RRC.

In the embodiments of the present disclosure, a plurality of BWPs may be configured for a terminal through the RRC, a plurality of search space groups may be configured on each BWP, and specific parameters of search space groups on the plurality of BWPs of the terminal may be configured independently. The number of search spaces must be consistent or can remain inconsistent.

In addition, in a Carrier Aggregation (CA) scenario, a plurality of serving cells is configured for the terminal through the RRC. A function of search space groups can be configured for some serving cells and can be not configured for some other serving cells. This function can be configured for some BWPs of some serving cells. If a search space group and a corresponding switching function are not configured on a serving cell, an indication of the search space group switching in related DCI for the cell is ignored. If a search space group and its switching function are not configured on a current BWP, a relevant switching indication is ignored.

Embodiments of the present disclosure will be described below with reference to the accompanying drawings. A method for detecting a PDCCH and a device according to the embodiments of the present disclosure may be applied to a wireless communications system. Referring to FIG. 1, it is a schematic architectural diagram of a wireless communications system according to an embodiment of the present disclosure. As shown in FIG. 1, the wireless communications system may include: a network device 11 and a terminal 12. The terminal 12 may be denoted as a UE12, and the terminal 12 may communicate with the network device 11 (to transmit signaling or transmit data). In actual application, a connection between the foregoing devices may be a wireless connection. To conveniently and intuitively represent a connection relationship between the devices, a solid line is used for illustration in FIG. 1.

The network device 11 provided in this embodiment of the present disclosure may be a base station, and the base station may be a generally used base station, or may be an evolved node base station (eNB), or may further be a device such as a network device (for example, a next generation node base station (gNB) or a transmission and reception point TRP)) in a 5G system.

The terminal 12 provided in this embodiment of the present disclosure may be a mobile phone, a tablet computer, a notebook computer, an Ultra-Mobile Personal Computer, (UMPC), a netbook, a Personal Digital Assistant (PDA), a Mobile Internet Device (MID), a wearable device, an in-vehicle device, or the like.

Figure 2:
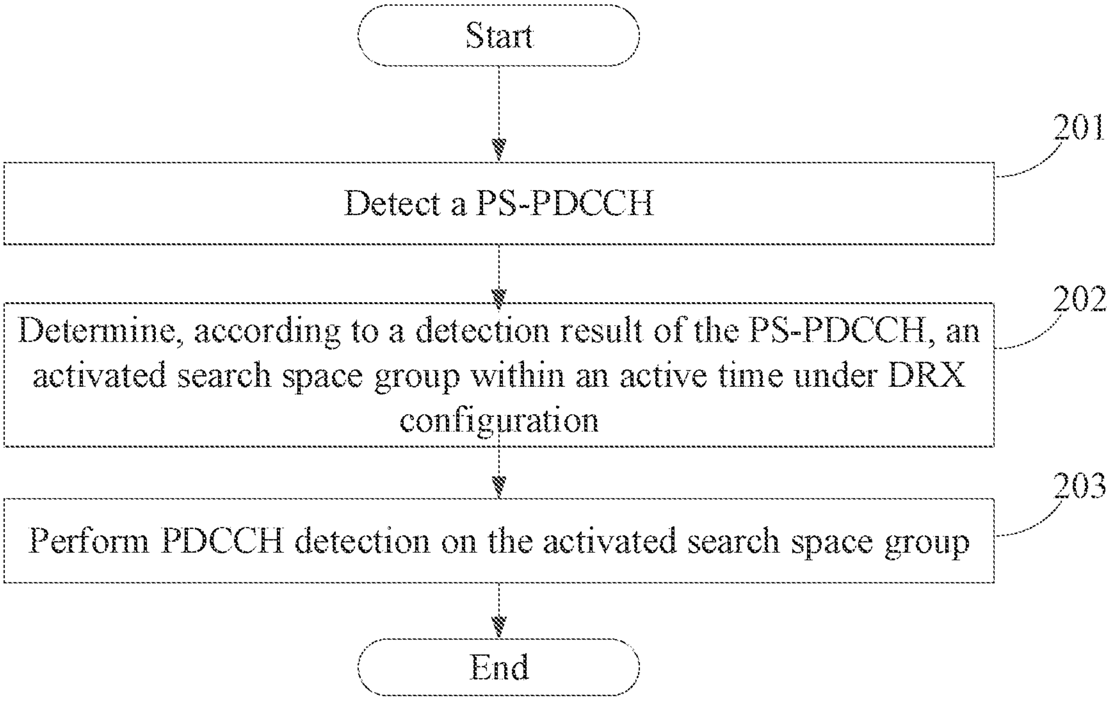
FIG. 2 is a first flowchart of a method for detecting a PDCCH according to an embodiment of the present disclosure.

Referring to FIG. 2, an embodiment of the present disclosure provides a method for detecting a PDCCH. The method is performed by a terminal and includes: step 201, step 202, and step 203.

Step 201: Detect a Power Save Physical Downlink Control Channel (PS-PDCCH).

The PS-PDCCH carries Downlink Control Information (DCI) scrambled by a power-saving radio network temporary identity (PS-RNTI), such as DCI format 2-6.

For example, the PS-PDCCH is detected within a preset detection range. The preset detection range may be a detection range specified in a protocol. The detection range may be a range from a power-saving offset (PS-offset) to next Discontinuous Reception (DRX) onduration (ON) and excludes a minimum gap. If a group of search space (SS) of a PS-PDCCH covers the PS-offset, the group of search space is invalid entirely. In addition, a UE does not need to monitor the PS-PDCCH within the minimum gap. Step 202: Determine, according to a detection result of the PS-PDCCH, an active search space group within an active time under Discontinuous Reception (DRX) configuration.

It can be understood that the search space group is configured for each BWP of each serving cell. It is stipulated in a protocol that at least two same or different search space groups are configured for each BWP of each cell, or the like. Therefore, determining the search space group activated within the active time under the DRX configuration may be determining an active search space group on a current activated BWP of each serving cell of a terminal based the DRX configuration within the active time.

Step 203: Perform PDCCH detection on the active search space group.

The PDCCH detection is performed on the active search space group according to a delay of the search space group switching. The delay of the search space group switching is consistent with a preset minimum gap.

Further, the minimum gap is greater than or equal to a delay of search space group switching specified in a protocol. For example, the minimum gap is several time slots for an active downlink BWP before enabling of a drx-ondurationtimer.

In some embodiments of the present disclosure, step 202 may be implemented in the following manners.

Manner 1: If DCI in a detected PS-PDCCH includes an indication field of the search space group switching, the active search space group based on the DRX configuration within the active time is determined according to the indication field of the search space group switching.

For example, detection of the PS-PDCCH may refer to detection of the PS-PDCCH within a preset detection range.

Manner 2: If DCI in a detected PS-PDCCH includes an indication field of the search space group switching and the indication field of the search space group switching is valid, determine, according to the indication field of the search space group switching, the active search space group based on the DRX configuration within the active time.

The indication field of the search space group switching is valid in one of the following conditions.

Condition 1: The DCI in the PS-PDCCH includes the indication field of the search space group switching and a wake-up indication field, and the wake-up indication field indicates that a drx-ondurationtimer in a next DRX cycle is enabled.

For example, the indication field of the search space group switching and wake-up indication field are configured for the DCI in the PS-PDCCH, and when the drx-ondurationtimer is enabled, the indication field of the search space group switching is valid.

Condition 2: The DCI in the PS-PDCCH includes the indication field of the search space group switching and a Scell dormancy indication field, and the Scell dormancy indication field indicates that a Scell group enters a non-dormancy status, and the indication field of the search space group switching is valid in the Scell group that enters the non-dormancy status.

It can be understood that because SCell dormancy indication is only for a SCell, and a Pcell cannot enter a dormancy status. Therefore, as long as the drx-ondurationtimer is enabled for the Pcell, the indication field of the search space group switching is valid for the Pcell.

For example, the UE has six serving cells, including one Pcell and five Scells. The five Scells are divided into three Scell groups for the UE through RRC or according to a Scell group reported by the UE. In addition, the network configures the Scell dormancy indication field and the indication field of the search space group switching in the DCI in the PS-PDCCH through RRC signaling. The Scell dormancy indication field indicates that Scell group with index 1 and Scell group with index 2 enter the non-dormant status, and Scell group3 enters the dormant status. Then the indication field of the search space group switching is valid in the Pcell, Scell group with index 1, and Scell group with index 2. That is, for the Scell group with index 1 and Scell group with index 2, the active search space group can be determined according to content indicated by the indication field of the search space group switching. For the Scell group3, the indication field of the search space group switching is invalid.

Condition 3: The DCI in the PS-PDCCH includes the indication field of the search space group switching, the wake-up indication field, and the Scell dormancy indication field, and the wake-up indication field indicates that the drx-ondurationtimer in a next DRX cycle is enabled.

That is, when the indication field of the search space group switching, the Scell dormancy indication field, and the wake-up indication field are configured for the DCI in the PS-PDCCH, and the wake-up indication field indicates that the drx-ondurationtimer in the next DRX cycle is enabled, it can be understood that a priority of the indication field of the search space group switching is superior to that of the Scell dormancy indication field. In this case, the Scell dormancy indication is invalid, but the indication field of the search space group switching is valid.

Condition 4: The DCI in the PS-PDCCH includes the indication field of the search space group switching, a wake-up indication field, and a Scell dormancy indication field, the wake-up indication field indicates that a drx-ondurationtimer in a next DRX cycle is enabled, the Scell dormancy indication field indicates that a Scell group enters a non-dormant status, and the indication field of the search space group switching is valid in the Scell group that enters the non-dormant status.

For example, the UE has six serving cells, including one Pcell and five Scells. The five Scells are divided into three Scell groups for the UE through RRC or according to a Scell group reported by the UE. In addition, the network configures the Scell dormancy indication field, the wake-up indication field, and the indication field of the search space group switching in the DCI in the PS-PDCCH through RRC signaling. The wake-up indication field indicates that the drx-ondurationtimer in the next DRX cycle is enabled, and the Scell dormancy indication field indicates that Scell group with index 1 and Scell group with index 2 enter the non-dormant status, and Scell group3 enters the dormant status. Then the indication field of the search space group switching is valid in the Pcell, Scell group with index 1, and Scell group with index 2. That is, for the Scell group with index 1 and Scell group with index 2, the active search space group can be determined according to content indicated by the indication field of the search space group switching. For the Scell group3, the indication field of the search space group switching is invalid.

Condition 5: The DCI in the PS-PDCCH includes only the indication field of the search space group switching.

For example, the UE has six serving cells, including one Pcell and five Scells. The five Scells are divided into three Scell groups for the UE through RRC or according to a Scell group reported by the UE. In addition, the network configures the indication field of the search space group switching in the DCI in the PS-PDCCH through RRC signaling. That is, for the Pcell, Scell group with index 1, Scell group with index 2, and Scell group3, the active search space group can be determined according to the content indicated by the indication field of the search space group switching.

In this embodiment of the present disclosure, the DCI in the PS-PDCCH may include indication information of a plurality of terminals.

For example, the DCI in the PS-PDCCH includes indication information of two terminals. Indication information of each terminal forms a separate group: for example, a wake-up indication field corresponding to UE1, a Scell dormancy indication field corresponding to the UE1, and an indication field of search space group switching corresponding to the UE1; a wake-up indication field corresponding to UE2, a Scell dormancy indication field corresponding to the UE2, and an indication field of search space group switching corresponding to the UE2.

For another example, indication information of all terminals (or terminal groups) forms a group: wake-up indication fields corresponding to UE1 and UE2, Scell dormancy indication fields corresponding to the UE1 and UE2, and indication fields of search space group switching corresponding to the UE1 and UE2.

The length of the DCI in the PS-PDCCH may be 0-6 bits.

Further, if the indication field of the search space group switching is added to the DCI in the PS-PDCCH, the indication field of the search space group switching in the DCI in the PS-PDCCH may be set after the wake-up indication field and/or the Scell dormancy indication field.

It can be understood that the indication field of the search space group switching in the DCI in the PS-PDCCH may be optional or a field that must exist. The indication field of the search space group switching may exist independently or needs to coexist with the wake-up indication field and/or the Scell dormancy indication field. For example, the wake-up indication field and the indication field of the search space group switching are configured in the DCI in the PS-PDCCH through the RRC.

Manner 3: If the PS-PDCCH is detected, the DCI in the PS-PDCCH includes the indication field of the search space group switching, and the indication field of the search space group switching is invalid, a default search space group (default SS group), or all search space groups configured for the terminal, or all search space groups configured for the terminal on a current active BWP are determined as the active search space group based on the DRX configuration within the active time.

It can be understood that if the foregoing condition in which the indication field of the search space group switching is valid is not satisfied, it means that the indication field of the search space group switching is invalid.

It can be understood that the default search space group may be a redefined or reconfigured search space group in addition to a configured search space group, or may be any one or more of configured search space groups, may be a default search space group specified in a protocol, or may also be any one or more search space sets configured in another protocol version. Different default search space groups may be selected on different BWPs or different serving cells. For example, the default search space group may be a set of all search spaces configured on a corresponding active BWP of each serving cell in a standard protocol version 15. It can be understood that the UE needs to monitor the PDCCH on any search space set configured on a corresponding active BWP.

The default search space group may be configured through Radio Resource Control (RRC) or DCI.

Manner 4: If the PS-PDCCH is detected within a preset detection range, the DCI in the PS-PDCCH excludes an indication field of the search space group switching, a default search space group, all search space groups configured for the terminal, or all search space groups configured for the terminal on a current active BWP are determined as the active search space group based on the DRX configuration within the active time.

In some other embodiments of the present disclosure, step 202 may be implemented in the following manner.

Manner 1: If the PS-PDCCH is not detected within a preset detection range, a first parameter (for example, ps-wakeupornot) is configured through high-layer signaling, and the first parameter indicates that a drx-ondurationtimer in a next DRX cycle is enabled, a default search space group, all search space groups configured for the terminal, or all search space groups configured for the terminal on the current active BWP are determined as the active search space group based on the DRX configuration within the active time.

For example, if the terminal does not detect the PS-PDCCH within the preset detection range, and the parameter ps-wakeupomot is configured for the terminal through the RRC, when the parameter ps-wakeupomot is configured to enable an ondurationtimer, the UE is in the default search space group, or monitors the PDCCH on all search space groups configured for the terminal or on all search space groups configured on the current active BWP.

Manner 2: If the PS-PDCCH is not detected within a preset detection range, and a first parameter (for example, ps-wakeupomot) is not configured through high-level signaling, a default search space group, all search space groups configured for the terminal, or all search space groups configured for the terminal on the current active BWP are determined as the active search space group based on the DRX configuration within the active time.

For example, if the terminal does not detect the PS-PDCCH within the preset detection range, and the parameter ps-wakeupomot is not configured through the RRC, the UE monitors the PDCCH in the default search space group or in all search space groups configured on the current active BWP.

Manner 3: If the PS-PDCCH is not detected within a preset detection range, a default search space group, all search space groups configured for the terminal, or all search space groups configured for the terminal on the current active BWP are determined as the active search space group based on the DRX configuration within the active time.

For example, if the terminal does not detect the PS-PDCCH in the preset detection range, the UE monitors the PDCCH in the default search space group, all search space groups configured for the terminal, or all search space groups configured on the current active BWP.

Manner 4: If the PS-PDCCH is detected by mistake within a preset detection range, a default search space group or all search space groups configured for the terminal on the current active BWP are determined as the active search space group based on the DRX configuration within the active time.

Detection by mistake means that: in at least one or all Monitoring Occasions (MO) of the PS-PDCCH, Cyclic Redundancy Check (CRC) of the DCI in the PS-PDCCH fails or another check fails, which is not limited herein.

For example, if the terminal fails to pass the check when detecting CRC of the DCI in the PS-PDCCH within the preset detection range, the UE monitors the PDCCH in the default search space group or in all search space groups configured on the current active BWP.

Manner 5: If no valid Monitoring Occasions (MO) is provided for the PS-PDCCH within a preset detection range, a default search space group, all search space groups configured for the terminal, or all search space groups configured for the terminal on the current active BWP are determined as the active search space group based on the DRX configuration within the active time.

For example, if a downlink time slot within the preset detection range is changed to an uplink time slot due to a Slot Format Indication (SFI) of DCI scheduling, resulting in absence of a valid MO, the UE monitors the PDCCH in the default search space group or all search space groups configured on the current active BWP.

The absence of a valid PS-PDCCH MO means that a position of a time domain or frequency domain of the MO conflicts with the following channel/signal, or the terminal is not required to perform detection on the MO.

The channel/signal includes one of the following:

(1) a resource for transmitting a first signal or a first channel;

(2) a flexible symbol; or (3) an uplink symbol.

The first signal or first channel includes: a Synchronization Signal and PBCH block (SSB), a CSI Reference Signal (CSI-RS), a Physical Uplink Control Channel (PUCCH), a Physical uplink shared channel (PUSCH), a Sounding reference signal (SRS), and a Random Access Response (RAR).

In this embodiment of the present disclosure, the indication field for the search space group switching added to the DCI in the PS-PDCCH may indicate switching to a corresponding search space group by cell and/or cell group and/or SCell group, or may indicate switching to one or more search space groups by cell and/or cell group and/or Scell group, where all cells in the cell group switch to a same search space group, and all SCells in the SCell group switch to a same search space group.

For example, the indication field of the search space group switching may perform an indication in units of cell and SCell group. For example, the indication field of the search space group switching may perform an indication in units of Pcell and SCell group. For still another example, the indication field of the search space group switching may perform an indication by SCell group (rather than Pcell group).

The indication field of the search space group switching indicates one or more of the following.

(1) All cells in a Cell Group (CG) switch to a same search space group.

It can be understood that the PS-PDCCH is configured per CG. Therefore, an indication range of the PS-PDCCH configured on a Special Cell (SPcell) in each CG is for each CG.

For example, in a single CG, two search space groups, SS group with index 1 and SS group with index 2, are configured through the RRC on each BWP of each serving cell of the terminal, and the terminal has five serving cells in total. There may be one indication bit of the search space added to the DCI in the PS-PDCCH: if a current active search space group is SS group with index 1, "0" represents that all serving cells do not switch, the SS group with index 1 is still activated, and "1" represents that all serving cells switch to the SS group with index 2 to monitor the PDCCH.

(2) Each cell switches to a corresponding search space group.

For example, in a single cell, two search space groups, SS group with index 1 and SS group with index 2, are configured through the RRC on each BWP of each serving cell of the terminal, and the terminal has five serving cells in total. The number of indication bits of the search space added to the DCI in the PS-PDCCH is equal to the total number of serving cells, for example: "01110", indicating that the five serving cells switch or do not switch in sequence, where "0" represents no switching, and "1" represents switching.

Serving cells of the terminal can be divided into one or more DRX groups through the RRC, and each DRX group has a corresponding PS-PDCCH, indicating that search space group switching is performed for cells included in the DRX group.

(3) Each SPcell switches to a corresponding search space group.

It may be that an indication of the search space group acts on the SPcell only, and the SPcell refers to a Primary Secondary Cell (Pscell) of a Secondary Cell group (SCG) in a scenario of a Primary Cell (Pcell) and dual connectivity (DC).

(4) Each secondary cell group (Scell group) switches to a corresponding search space group, where all Scells in one Scell group switch to a same search space group.

It may be that the search space group acts on the SCell only.

For example, two search space groups are configured for each serving cell of the terminal through the RRC, and the terminal has five serving cells currently, including four Scells divided into two SCell groups. The number of indication bits of the search space switching added to the DCI in the PS-PDCCH is equal to the number of Scell groups. For example, 1 bit in each Scell group is used for indication "01" of the search space group, representing that a Scell group with index 1 does not switch, and a SCell group with index 2 switches.

It can be understood that (3) and (4) may be indicated in combination, for example, a Pcell is indicated independently, and another SCell may be indicated by SCell group or SCell. That is, the indication field of the search space group switching can independently indicate that different kinds of search space group switching are performed for the Pcell and the SCell or the SCell group, respectively.

For example, two search space groups are configured for a serving cell (for example, each serving cell) of the terminal through the RRC. The terminal has five serving cells currently, one Pcell and four Scells, and every two Scells are divided into one group, that is, a total of two SCell group (grouping of the Scell groups may be configured through the RRC or reported by the terminal, where configuration through the RRC may be consistent with or inconsistent with the Scell group configured in Scell dormancy). The number of switching indication bits of the search space added to the DCI in the PS-PDCCH is equal to the number of PCells and Scell groups. For example, 1 bit in each group is used for indication "010" of the search space group, and then the indication represents that the Pcell does switch, a Scell group with index 1 switches, and a Scell group with index 2 does not switch.

In this embodiment of the present disclosure, a bit length of the indication field of the search space group switching is related to one or more of the following: (1) content indicated by the indication field of the search space group switching; (2) the number of serving cells of the terminal; (3) and the number of search space groups of the terminal.

Exemplarily, the indication field of the search space group switching is indicated by one of the following.

(1) A bitmap, including at least one bit, where each bit corresponds to a serving cell, cell group, or Scell group, indicating whether search space group switching is performed for the serving cell, cell group, or Scell group, for example, "0" represents no switching, and "1" represents switching.

(2) A bitmap, including at least one bit, where each bit corresponds to a serving cell, CG, or Scell group, and the bit is used to indicate whether a search space group switches for the corresponding serving cell, CG, or Scell group.

For example, the bitmap includes only 1 bit, and the 1 bit is used to indicate that whether a current search space group is switches to another search space group.

It can be understood that if two search space groups are configured, the another search space group refers to another search space group except the current search space groups, and if a plurality of search space groups are configured, the another search space group is any other search space group except the current search space groups.

For example, two SS groups are configured through the RRC, and 1 bit in the DCI of the PS-PDCCH indicates whether SS group switching is performed relative to the current SS groups. "0" represents no switching, and "1" represents switching to another SS group.

(3) A bitmap, including at least one bit, where each bit corresponds to a search space group of a serving cell, CG, or Scell group, and the bit is used to indicate whether the corresponding search space group is activated.

For example, two search space groups are configured for a serving cell of the terminal through the RRC. The terminal has five serving cells currently, one Pcell and four Scells, and every two Scells are divided into one group, that is, a total of two SCell groups. For example, bit: 011110, where first two bits represent two search space groups corresponding to the Pcell, group 1 is not activated, and group 2 is activated; next two bits represent two search space groups of the first Scell group, and both group 1 and group 2 are activated; and so on.

(4) A bitstring, where the bitstring is used to indicate an active search space group.

For example, three search space groups are configured for a serving cell of the terminal through the RRC. The terminal has five serving cells currently, one Pcell and four Scells, and two Scells are divided into one group, that is, a total of two SCell groups. For example, bit: 100100, where first two bits indicate that a third search space group of the Pcell is activated; next two bits indicate that a second search space group of a first SCell group is activated; and so on.

Each search space group has a corresponding group index. For example, four search space groups (SS groups) are configured, and corresponding numbers are 00, 01, 10, and 11 respectively. The bitstring is 0011, indicating that a SS group0 and SS group3 are activated.

It can be understood that if two search space groups are configured, the another search space group refers to another search space group except the current search space groups, and if a plurality of search space groups are configured, the another search space group is any other search space group except the current search space groups.

For example, two SS groups are configured through the RRC, and 1 bit in the DCI of the PS-PDCCH indicates whether SS group switching is performed relative to the current SS groups. "0" represents no switching, and "1" represents switching to another SS group.

A manner for detecting a PDCCH in an embodiment of the present disclosure is described below with reference to Example 1 and Example 2.

Example 1: Two search space groups, a SS group with index 1 and SS group with index 2, are configured for the terminal through the RRC, where a monitoring period for a PDCCH on the SS group with index 1 is 2 symbols; and a monitoring period for a PDCCH on the SS group with index 2 is 1 time slot.

The indication field of the search space group switching in the DCI in the PS-PDCCH supports activation of only a single search space group, and the bitstring is applied. If a current active search space group is the SS group with index 1, and the indication field of the search space group switching is 0, no switching is performed (that is, switching for the search space group is not performed). If the indication field of the search space group switching is 1, the SS group with index 2 switching is performed to monitor the PDCCH in a corresponding active time.

Example 2: Two search space groups, a SS group with index 1 and SS group with index 2, are configured for the terminal through the RRC, where a monitoring period for PDCCH on the SS group with index 1 is 2 symbols; and a monitoring period for a PDCCH on the SS group with index 2 is 1 slot.

The indication field of the search space group switching in the DCI in the PS-PDCCH supports activation of a plurality of search space groups, and a bitmap is applied. If a bit of a current switching indication field of a search space group is 11, a SS group0 and the SS group with index 1 are activated simultaneously, and the terminal needs to monitor PDCCHs on the two SS groups. If the bit of the current indication field of the search space group switching is 01, the SS group with index 1 is activated, and the terminal needs to monitor the PDCCH in the active time only on the SS group with index 1.

In this embodiment of the present disclosure, an indication of the search space group switching is obtained through a detection result of the PS-PDCCH, so that the terminal can perform PDCCH detection on a corresponding active search space group according to the indication of the search space group switching, which can reduce frequent blind detection on the PDCCH by the terminal and achieve energy saving and power saving for the terminal.

Figure 3:
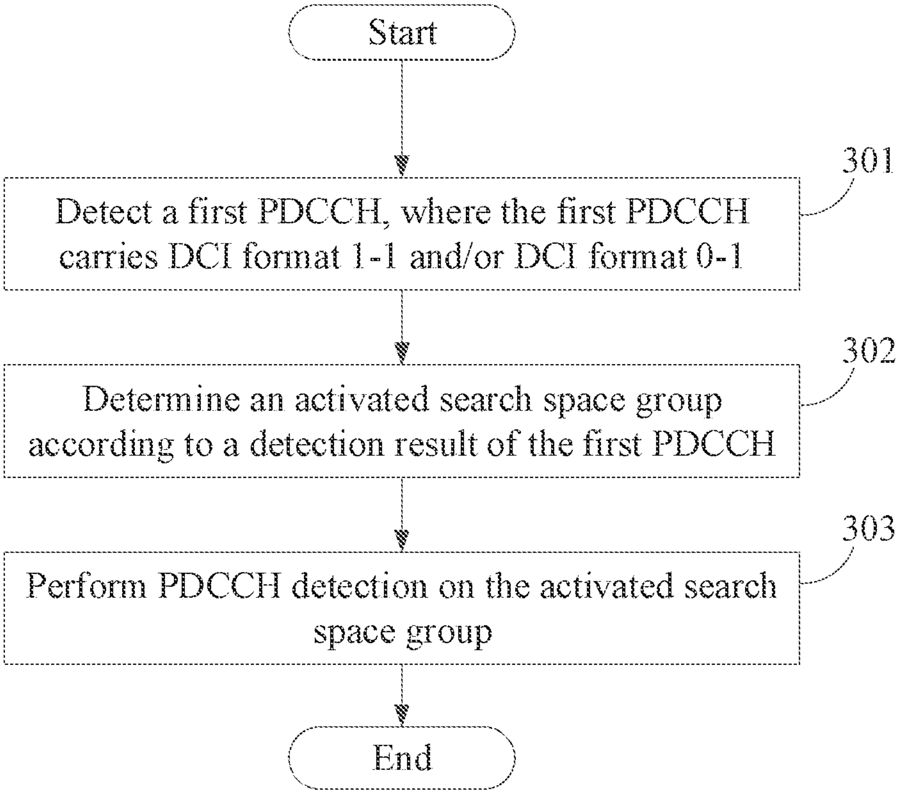
FIG. 3 is a second flowchart of a method for detecting a PDCCH according to an embodiment of the present disclosure.

Referring to FIG. 3, an embodiment of the present disclosure further provides a method for detecting a PDCCH. The method is performed by a terminal and includes: step 301, step 302, and step 303.

Step 301: Detect a first PDCCH, where the first PDCCH carries DCI format 1-1 and/or DCI format 0-1.

Step 302: Determine an active search space group according to a detection result of the first PDCCH.

For example, if the terminal detects a second PDCCH by mistake, a default search space group, or all search space groups configured for the terminal, or all search space groups configured for the terminal on a current active BWP are determined as an active search space group.

For another example, if the first PDCCH is detected, and content of an indication of search space group switching corresponding to the first PDCCH conflicts with content of an indication of another search space group switching simultaneously obtained by the terminal, a default search space group, all search space groups configured for the terminal, or all search space groups configured for the terminal on a current active BWP are determined as an active search space group.

For example, when an indication is performed by cell group, the cell group includes a cell1 and cell2. For a cell1 in a slot, a timer expires, causing all cells in a cell group to switch to a SS group with index 1, but the cell2 in the same slot receives a DCI indication of switching to a SS group with index 2. Due to an indication conflict, the default search space group, all search space groups configured for the terminal, or all search space groups configured for the terminal on a current active BWP are determined as the active search space group.

In this embodiment of the present disclosure, the method may further include: within a BWP switching delay, the default search space group, all search space groups configured for the terminal, or all search space groups configured for the terminal on the current active BWP are determined as the active search space groups.

Step 303: Perform PDCCH detection on the active search space group.

The DCI format 1-1 or DCI format 0-1 includes: an indication bit of the search space group switching. The indication bit of the search space group switching is used to indicate activation of the search space group, that is, the indication bit of the search space group switching can be used to activate the search space group.

Content of the indication bit of the search space group switching indicates one or more of the following:

(1) all cells in a CG switch to a same search space group;

(2) each cell switches to a corresponding search space group;

(3) each SPcell switches to a corresponding search space group; or (4) each Scell group switches to a corresponding search space group, where all Scells in one Scell group switch to a same search space group.

In this embodiment of the present disclosure, the DCI format 1-1 or DCI format 0-1 further includes: a minimum scheduling offset (e.g., minimumschedulingoffset) indication field. and the indication bit of the search space group switching is located in the minimum scheduling offset indication field of the first DCI.

For example, 1 bit is added to the minimum scheduling offset indication field, and the 1 bit is used to indicate which SS group is to switch to.

In this embodiment of the present disclosure, the DCI format 1-1 or DCI format 0-1 includes: a minimum scheduling offset indication field or a Scell dormancy indication field. The minimum scheduling offset indication field or the Scell dormancy indication field is used for a bundle indication of the search space group switching.

That is, if no additional indication bit of the search space group switching is added, the bundle indication of the search space group is performed in combination with the minimumschedulingoffset indication field of the DCI format 1-1 or DCI format 0-1. For example, when K0/K2 value indicated by cross-carrier scheduling is 0, the SS group with index 1 or default search space group is activated, and when K0/K2 value is not 0, the SS group with index 2 or default search space group is activated.

In this embodiment of the present disclosure, since the application delay of the minimum scheduling offset indication has already satisfied the delay of the search space group switching. In this case, the delay of the search space group switching is consistent with the application delay of the cross-slot scheduling. That is, only after the application delay is satisfied, the terminal can perform PDCCH detection in a switched search space group.

In some implementation manners of the present disclosure, the DCI format 1-1 or DCI format 0-1 further includes a Scell dormancy indication field. The Scell dormancy indication field and the indication bit of the search space group switching is used simultaneously or independently.

In this embodiment of the present disclosure, the search space group switching is implicitly indicated. For example, a current search space is a SS group with index 1, and SS group with index 2 switching is performed after the terminal receives scheduling DCI (for example, the scheduling DCI may indicate a downlink or uplink grant (DL or UL grant)).

Exemplarily, a detection period for a PDCCH on the SS group with index 1 configured by the network is 10 time slots, and that on the SS group with index 2 is 1 time slot, and the SS group with index 1 is used currently. As long as the terminal receives scheduling DCI, the SS group with index 2 switches. In addition, in a DC-CA scenario, if the UE receives the scheduling DCI in any cell of a cell group, a cell group, as a unit, will entirely switch to the SS group with index 2, or only a cell that receives the scheduling DCI, as a unit, switches to the SS group with index 2.

In some implementation manners of the present disclosure, the search space group switching is implicitly indicated. One timer is configured via the RRC signal. The function of the timer is to automatically switch from the SS group with index 2 to the SS group with index 1 if the timer expires. The timer is reset when the scheduling DCI is received.

It can be understood that the timer may be configured for per serving cell, or may be configured for per cell group.

Exemplarily, the network configures the PDCCH detection periodicity of set0 is 10 slots, and that of set1 is 1 slot. Currently, the SS group with index 2 is adopted. If the terminal receives scheduling DCI within the timer running, the terminal restarts the timer. If the terminal does not receive DCI within the timer running, then switch to SS group with index 1. In addition, in a CA-DC scenario, if the timer for the terminal expires in any cell of a cell group, the entire cell group will switch to the SS group with index 1 (that is, per cell group), or, only the cell in which the timer expires will switch to the SS group with index 1 (that is, per cell).

In this embodiment of the present disclosure, an indication of the search space group switching is obtained through a detection result of a first PS-PDCCH, so that the terminal can perform PDCCH detection on a corresponding active search space group according to the indication of the search space group switching, which can reduce frequent blind detection on the PDCCH by the terminal and achieve energy saving and power saving for the terminal.

Figure 4:
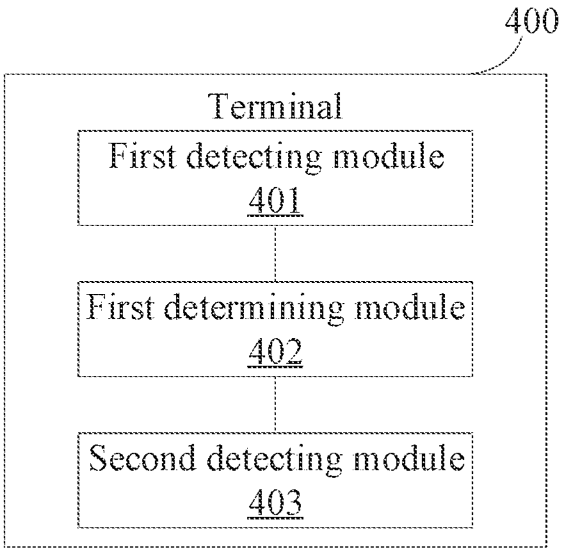
FIG. 4 is a first schematic structural diagram of a terminal according to an embodiment of the present disclosure.

Referring to FIG. 4, an embodiment of the present disclosure further provides a terminal. The terminal 400 includes:

a first detecting module 401, configured to detect a PS-PDCCH; and a first determining module 402, configured to determine, according to a detection result of the PS-PDCCH, an active a search space group within an active time under DRX configuration; and a second detecting module 403, configured to perform PDCCH detection on the active search space group.

In some implementation manners, the first determining module 402 is further configured to:

if DCI in the detected PS-PDCCH includes an indication field of the search space group switching, or if the PS-PDCCH is detected, DCI in the PS-PDCCH includes an indication field of the search space group switching and the indication field of the search space group switching is valid, determine, according to the indication field of the search space group switching, the active search space group based on the DRX configuration within the active time;

or if DCI in the detected PS-PDCCH includes an indication field of search space group switching and the indication field of the search space group switching is invalid, or if DCI in the detected PS-PDCCH does not include an indication field of search space group switching, determine a default search space group, all search space groups configured for the terminal, or all search space groups configured for the terminal on a current active BWP as the active search space group based on the DRX configuration within the active time.

In some implementation manners, that the indication field of the search space group switching is valid in the following condition:

the DCI in the PS-PDCCH includes the indication field of the search space group switching and a wake-up indication field, and the wake-up indication field indicates that a drx-ondurationtimer in a next DRX cycle is enabled;

or the DCI in the PS-PDCCH includes: the indication field of the search space group switching and a Scell dormancy indication field, and the Scell dormancy indication field indicates that a Scell group enters a non-dormancy status, and the indication field of the search space group switching is valid in the Scell group that enters the non-dormancy status;

or the DCI in the PS-PDCCH includes: the indication field of the search space group switching, a wake-up indication field, and a Scell dormancy indication field, the wake-up indication field indicates that a drx-ondurationtimer in a next DRX cycle is enabled, the Scell dormancy indication field indicates that a Scell group enters a non-dormant status, and the indication field of the search space group switching is valid in the Scell group that enters the non-dormant status;

or the DCI in the PS-PDCCH includes: the indication field of the search space group switching, a wake-up indication field, and a Scell dormancy indication field, and the wake-up indication field indicates that a drx-ondurationtimer in a next DRX cycle is enabled;

or the DCI in the PS-PDCCH includes only the indication field of the search space group switching.

In some implementation manners, the indication field of the search space group switching is after the wake-up indication field and/or the Scell dormancy indication field.

In some implementation manners, the first determining module 402 is further configured to:

if the PS-PDCCH is not detected within a preset detection range, if the PS-PDCCH is detected by mistake within a preset detection range, or if no valid MO of a first PDCCH exists within a preset detection range, determine a default search space group, all search space groups configured for the terminal, or all search space groups configured for the terminal on a current active BWP as the active search space group based on the DRX configuration within the active time.

In some implementation manners, the PS-PDCCH is not detected within the preset detection range, and a first parameter is configured through high-layer signaling;

or the PS-PDCCH is not detected within the preset detection range, and a first parameter is not configured through high-layer signaling.

The first parameter indicates that a drx-ondurationtimer in a next DRX cycle is enabled.

In this embodiment of the present disclosure, the second detecting module 403 is further configured to: perform the PDCCH detection on the active search space group according to a delay of the search space group switching. The delay of the search space group switching is consistent with a preset minimum gap.

In some implementation manners, content of the indication field of the search space group switching indicates one or more of the following:

all cells in a CG switch to a same search space group;

each cell switches to a corresponding search space group;

each SPcell switches to a corresponding search space group; or each Scell group switches to a corresponding search space group, where all Scells in one Scell group switch to a same search space group.

In some implementation manners, a bit length of the indication field of the search space group switching is related to one or more of the following:

content indicated by the indication field of the search space group switching;

the number of serving cells of the terminal; or the number of search space groups of the terminal.

In some implementation manners, the indication field of the search space group switching includes one or more of the following:

a bitmap, including at least one bit, where each bit corresponds to a search space group, and the bit is used to indicate whether a corresponding search space group is activated; or each bit corresponds to a serving cell, CG, or Scell group, and the bit is used to indicate whether search space group switching is performed for the corresponding serving cell, CG, or Scell group; or each bit corresponds to a search space group of a serving cell, CG, or Scell group, and the bit is used to indicate whether a corresponding search space group is activated; or a bitstring, where the bitstring is used to indicate the active search space group.

The terminal according to this embodiment of the present disclosure may perform the foregoing method embodiment shown in FIG. 2. An implementation principle and a technical effect of the terminal are similar to those of the method embodiment, and details are not described again in this embodiment.

Figure 5:
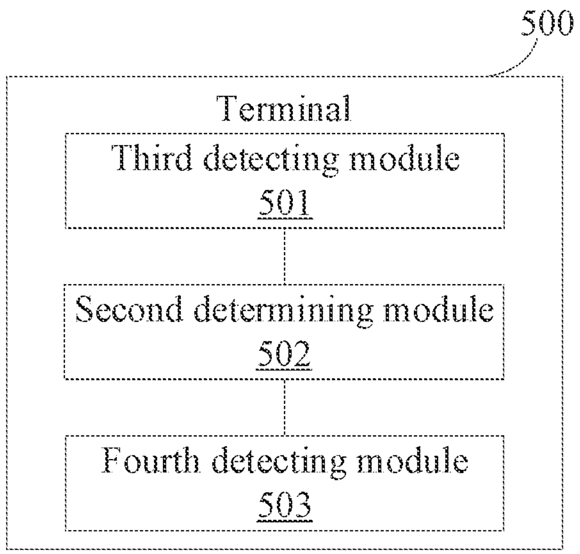
FIG. 5 is a second schematic structural diagram of a terminal according to an embodiment of the present disclosure.

Referring to FIG. 5, an embodiment of the present disclosure further provides a terminal. The terminal 500 includes:

a third detecting module 501, configured to detect a first PDCCH, where the first PDCCH carries DCI format 1-1 and/or DCI format 0-1;

a second determining module 502, configured to determine an active search space group according to a detection result of the first PDCCH; and a fourth detecting module 503, configured to perform PDCCH detection on the active search space group.

In some implementations manners, the second determining module 502 is further configured to:

if the first PDCCH is detected, and content of an indication of search space group switching corresponding to the first PDCCH conflicts with content of an indication of another search space group switching simultaneously obtained by the terminal, or if the terminal detects the first PDCCH by mistake, determine a default search space group, all search space groups configured for the terminal, or all search space groups configured for the terminal on a current active BWP as the active search space group.

In some implementation manners, the terminal 500 further includes a third determining module. The third determining module is configured to determine, within a BWP switching delay, the default search space group, all search space groups configured for the terminal, or all search space groups configured for the terminal on the current active BWP as the active search space group.

In some implementation manners, the DCI format 1-1 or DCI format 0-1 includes: an indication bit of the search space group switching. The indication bit of the search space group switching is used to indicate activation of the search space group.

In some implementation manners, the DCI format 1-1 or DCI format 0-1 further includes: a minimumschedulingoffset indication field, and the indication bit of the search space group switching is located in the minimumschedulingoffset indication field.

In some implementation manners, content indicated by the indication bit of the search space group switching includes one or more of the following:

indicating that all cells in a CG switch to a same search space group;

indicating that each cell switches to a corresponding search space group;

indicating that each SPcell switches to a corresponding search space group; or indicating that each Scell group switches to a corresponding search space group, where all Scells in one Scell group switch to a same search space group.

In some implementation manners, the DCI format 1-1 or DCI format 0-1 includes: a minimumschedulingoffset indication field or a Scell dormancy indication field. The minimumschedulingoffset indication field or Scell dormancy indication field is used for a bundle indication of the search space group switching.

The terminal according to this embodiment of the present disclosure may perform the foregoing method embodiment shown in FIG. 3. An implementation principle and a technical effect of the terminal are similar to those of the method embodiment, and details are not described again in this embodiment.

Figure 6:
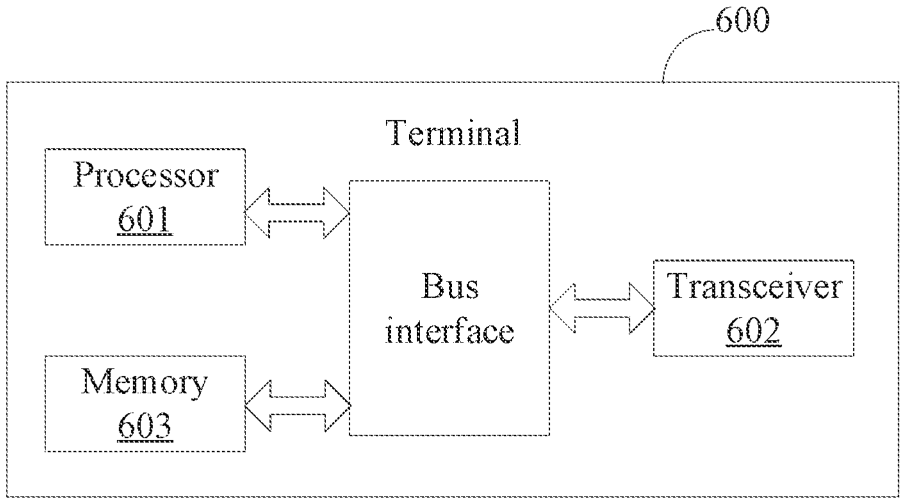
FIG. 6 is a third schematic structural diagram of a terminal according to an embodiment of the present disclosure.

As shown in FIG. 6, a terminal 600 shown in FIG. 6 includes: at least one processor 601, a memory 602, at least one network interface 604, and a user interface 603. Various components of the terminal 600 are coupled by using a bus system 605. It can be understood that the bus system 605 is configured to implement connection and communication between these components. In addition to a data bus, the bus system 605 further includes a power bus, a control bus, and a status signal bus. However, for clear description, various buses are marked as the bus system 605 in FIG. 6.

The user interface 603 may include a display, a keyboard, a clicking device (for example, a mouse, a trackball), a touch panel, a touchscreen, or the like.

It can be understood that the memory 602 in this embodiment of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. By way of example but not limitative description, many forms of RAMs may be used, for example, a Static RAM (SRAM), a Dynamic RAM (DRAM), a Synchronous DRAM (SDRAM), a Double Data rate SDRAM (DDRSDRAM), an Enhanced SDRAM (ESDRAM), a Synchlink DRAM (SLDRAM), and a Direct Rambus RAM (DRRAM). The memory 602 in the system and the method that are described in the embodiments of the present disclosure is to include but is not limited to these memories and any other suitable types of memories.

In some implementation manners, the memory 602 stores the following element: an executable module or a data structure, a subset of an executable module or a data structure, or an extended set of an executable module or a data structure: an operating system 6021 and an application program 6022.

The operating system 6021 includes various system programs, for example, a framework layer, a kernel library layer, and a driver layer, and is configured to implement various basic services and process a hardware-based task. The application program 6022 includes various application programs, for example, a media player and a browser, and is used to implement various application services. A program for implementing the method in this embodiment of the present disclosure may be included in the application program 6022.

In an embodiment of the present disclosure, when a program or an instruction stored in the memory 602 is called, or when a program or an instruction stored in the application program 6022 is executed, the steps of the method in FIG. 2 or FIG. 3 on a terminal side are implemented.

The terminal according to this embodiment of the present disclosure may perform the foregoing method embodiment. An implementation principle and a technical effect of the terminal are similar to those of the method embodiment, and details are not described again in this embodiment.

The method or algorithm steps described in combination with content disclosed in the present disclosure may be implemented by hardware, or may be implemented by a processor by executing software instructions. The software instruction may include a corresponding software module. The software module may be stored in a Random Access Memory (RAM), a flash memory, a Read-Only Memory (ROM), an Erasable PROM (EPROM), an Electrically EPROM (EEPROM), a register, a hard disk, a removable hard disk, a read-only optical disc, or any other form of storage medium familiar in the art. An exemplary storage medium is coupled to the processor, so that the processor can read information from the storage medium and can write information to the storage medium. The storage medium may also be a component of the processor. The processor and the storage medium may be located in an Application Specific Integrated Circuit (ASIC). In addition, the ASIC may be located in a core network interface device. The processor and the storage medium may exist in the core network interface device as discrete components.

It can be understood that the embodiments described in the present disclosure may be implemented by hardware, software, firmware, middleware, microcode, or a combination thereof. For implementation with hardware, the module, unit, submodule, subunit, and the like may be implemented in one or more Application Specific Integrated Circuits (ASIC), a Digital Signal Processing (DSP), a DSP Device (DSPD), aProgrammable Logic Device (PLD), a Field-Programmable Gate Array (FPGA), a general-purpose processor, a controller, a microcontroller, a microprocessor, another electronic unit for implementing the functions of this application, or a combination thereof.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing descriptions are merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be embodiments in a form of a complete hardware embodiment, a complete software embodiment, or an embodiment incorporating software and hardware aspects. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function specified in one or more procedures of the flowchart and/or in one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or another programmable device to implement steps for the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations to the embodiments of the present disclosure provided that these modifications and variations fall within the scope of the claims of the present disclosure and their equivalent technologies.

The invention claimed is:

1. A method for detecting a Physical Downlink Control Channel (PDCCH), performed by a terminal, comprising:

receiving a Radio Resource Control (RRC) signal, wherein the RRC signal is used for configuring a timer and configuring three Search Space (SS) groups;

switching to a specific SS group in the three SS groups when the timer expires;

resetting the timer when scheduling Downlink Control Information (DCI) is received, wherein the scheduling DCI indicates downlink grant or uplink grant;

detecting a first PDCCH, wherein the first PDCCH carries Downlink Control Information (DCI) format 1-1 or DCI format 0-1, wherein the DCI format 1-1 or DCI format 0-1 comprises an indication bit of search space group switching and the indication bit of the search space group switching is used to indicate activation of the search space group;

determining an active search space group according to a detection result of the first PDCCH; and performing PDCCH detection on the active search space group, wherein the determining an active search space group according to a detection result of the first PDCCH comprises:

when the first PDCCH is detected and content of an indication of search space group switching corresponding to the first PDCCH conflicts with content of an indication of another search space group switching simultaneously obtained by the terminal, or when the terminal detects the first PDCCH by mistake, determining a default search space group, all search space groups configured for the terminal, or all search space groups configured for the terminal on a current activated Band Width Part (BWP) as the active search space group.

2. The method according to claim 1, further comprising:

determining, within a Band Width Part (BWP) switching delay, the default search space group, all the search space groups configured for the terminal, or all the search space groups configured for the terminal on the current active BWP as the active search space group.

3. The method according to claim 1, wherein the DCI format 1-1 or DCI format 0-1 further comprises a minimum scheduling offset indication field, and the indication bits of the search space group switching are located in the minimum scheduling offset indication field.

4. The method according to claim 1, wherein content indicated by the indication bits of the search space group switching comprises one or more of the following:

indicating that all cells in a Cell Group (CG) switch to a same search space group;

indicating that each cell switches to a corresponding search space group;

indicating that each Special Cell (SPcell) switches to a corresponding search space group; or indicating that each Secondary Cell (Scell) group switches to a corresponding search space group, wherein all Scells in one Scell group switch to a same search space group.

5. The method according to claim 1, wherein:

the DCI format 1-1 or DCI format 0-1 further comprises: a minimum scheduling offset indication field or a Secondary Cell (Scell) dormancy indication field, wherein the minimum scheduling offset indication field or the Scell dormancy indication field is used for a bundle indication of the search space group switching.

6. A terminal, comprising: a memory, a processor, and a program that is stored in the memory and that can be run on the processor, wherein when the program is executed by the processor, cause the processor to perform operations comprising:

receiving a Radio Resource Control (RRC) signal, wherein the RRC signal is used for configuring a timer and configuring three Search Space (SS) groups;

switching to a specific SS group in the three SS groups when the timer expires;

resetting the timer when scheduling Downlink Control Information (DCI) is received, wherein the scheduling DCI indicates downlink grant or uplink grant;

detecting a first PDCCH, wherein the first PDCCH carries DCI format 1-1 or DCI format 0-1, wherein the DCI format 1-1 or DCI format 0-1 comprises indication bits of search space group switching, and the indication bits of the search space group switching are used to indicate activation of the specific SS group in the three SS groups;

determining an active search space group according to a detection result of the first PDCCH; and performing PDCCH detection on the active search space group, wherein the determining an active search space group according to a detection result of the first PDCCH comprises:

when the first PDCCH is detected and content of an indication of search space group switching corresponding to the first PDCCH conflicts with content of an indication of another search space group switching simultaneously obtained by the terminal, or when the terminal detects the first PDCCH by mistake, determining a default search space group, all search space groups configured for the terminal, or all search space groups configured for the terminal on a current active Band Width Part (BWP) as the active search space group.

7. The terminal according to claim 6, wherein when the program is executed by the processor, cause the processor to perform operations further comprising:

determining, within a Band Width Part (BWP) switching delay, the default search space group, all the search space groups configured for the terminal, or all the search space groups configured for the terminal on the current active BWP as the active search space group.

8. The terminal according to claim 6, wherein the DCI format 1-1 or DCI format 0-1 further comprises a minimum scheduling offset indication field, and the indication bits of the search space group switching are located in the minimum scheduling offset indication field.

9. The terminal according to claim 6, wherein content indicated by the indication bits of the search space group switching comprises one or more of the following:

indicating that all cells in a Cell Group (CG) switch to a same search space group;

indicating that each cell switches to a corresponding search space group;

indicating that each Special Cell (SPcell) switches to a corresponding search space group; or indicating that each Secondary Cell (Scell) group switches to a corresponding search space group, wherein all Scells in one Scell group switch to a same search space group.

10. The terminal according to claim 6, wherein:

the DCI format 1-1 or DCI format 0-1 further comprises: a minimum scheduling offset indication field or a Scell dormancy indication field, wherein the minimum scheduling offset indication field or the Scell dormancy indication field is used for a bundle indication of search space group switching.

11. A non-transient computer-readable storage medium, wherein the non-transient computer-readable storage medium stores a computer program, and when the computer program is executed by a processor of a terminal, cause the processor to perform operations comprising:

receiving a Radio Resource Control (RRC) signal, wherein the RRC signal is used for configuring a timer and configuring three Search Space (SS) groups;

switching to a specific SS group in the three SS groups when the timer expires;

resetting the timer when scheduling Downlink Control Information (DCI) is received, wherein the scheduling DCI indicates downlink grant or uplink grant;

detecting a first PDCCH, wherein the first PDCCH carries DCI format 1-1 or DCI format 0-1, wherein the DCI format 1-1 or DCI format 0-1 comprises indication bits of search space group switching, and the indication bits of the search space group switching are used to indicate activation of the specific SS group in the three SS groups;

determining an active search space group according to a detection result of the first PDCCH; and performing PDCCH detection on the active search space group, wherein the determining an active search space group according to a detection result of the first PDCCH comprises:

when the first PDCCH is detected and content of an indication of search space group switching corresponding to the first PDCCH conflicts with content of an indication of another search space group switching simultaneously obtained by the terminal, or when the terminal detects the first PDCCH by mistake, determining a default search space group, all search space groups configured for the terminal, or all search space groups configured for the terminal on a current active Band Width Part (BWP) as the active search space group.

12. The non-transient computer-readable storage medium according to claim 11, wherein when the program is executed by the processor, cause the processor to perform operations further comprising:

determining, within a Band Width Part (BWP) switching delay, the default search space group, all the search space groups configured for the terminal, or all the search space groups configured for the terminal on the current active BWP as the active search space group.

13. The non-transient computer-readable storage medium according to claim 11, wherein the DCI format 1-1 or DCI format 0-1 further comprises a minimum scheduling offset indication field, and the indication bits of the search space group switching are located in the minimum scheduling offset indication field.

14. The non-transient computer-readable storage medium according to claim 11, wherein content indicated by the indication bits of the search space group switching comprises one or more of the following:

indicating that all cells in a Cell Group (CG) switch to a same search space group;

indicating that each cell switches to a corresponding search space group;

indicating that each Special Cell (SPcell) switches to a corresponding search space group; or indicating that each Secondary Cell (Scell) group switches to a corresponding search space group, wherein all Scells in one Scell group switch to a same search space group.

* * * * *